United States Patent [19]

Ritsko et al.

[11] Patent Number: 4,495,158

[45] Date of Patent: Jan. 22, 1985

[54] PROCESS FOR THE RECOVERY OF TANTALUM VALUES

[75] Inventors: Joseph E. Ritsko; Howard L. Acla, both of Towanda, Pa.

[73] Assignee: GTE Products Corporation, Stamford, Conn.

[21] Appl. No.: 584,846

[22] Filed: Feb. 29, 1984

[51] Int. Cl.$^3$ .............................................. C01G 35/00
[52] U.S. Cl. ...................................... 423/65; 423/62; 423/68
[58] Field of Search ............... 423/62, 65, 68; 75/121

[56] References Cited

U.S. PATENT DOCUMENTS

| | | | |
|---|---|---|---|
| 1,802,242 | 4/1931 | Fink et al. | 423/68 |
| 2,773,737 | 12/1956 | Nielsen et al. | 423/65 |
| 3,099,526 | 7/1963 | Li et al. | 423/68 |
| 4,302,243 | 11/1981 | Tamaru et al. | 423/68 |

FOREIGN PATENT DOCUMENTS

| | | | |
|---|---|---|---|
| 58181709 | 10/1983 | Japan | 423/68 |
| 866716 | 4/1961 | United Kingdom | 423/65 |
| 956614 | 4/1964 | United Kingdom | 423/62 |

*Primary Examiner*—Herbert T. Carter
*Attorney, Agent, or Firm*—Robert E. Walter

[57] ABSTRACT

Tantalum is recovered from an impure source containing niobium, tungsten, titanium, iron, and other impurities by a process comprising mixing the impure source with an alkali metal carbonate, drying the resulting mixture, heating the dried mixture to convert the tungsten to a soluble form, leaching to solubilize the tungsten, digesting the resulting leached solids containing tantalum in hydrochloric acid to solubilize iron values and a portion of the titanium values, dissolving the leached solids containing tantalum values in hydrofluoric acid, adjusting the pH of the resulting solution to form a first tantalum precipitate, dissolving the first tantalum precipitate in oxalic acid adjusting the pH to form a second tantalum precipitate, dissolving and digesting the second tantalum precipitate in hydrochloric acid solution to form a third tantalum precipitate of high purity.

13 Claims, No Drawings

PROCESS FOR THE RECOVERY OF TANTALUM VALUES

BACKGROUND OF THE INVENTION

This invention relates to a process for recovery of tantalum and, optionally, niobium values from an impure source containing tantalum, tungsten, iron, titanium and other impurities. More particularly it relates to a process for recovery of high purity mixed oxides of tantalum and niobium from an impure source containing tantalum and, optionally, niobium, and tungsten, iron, titanium, and other impurities.

Tungsten carbide scrap material can contain titanium carbide tantalum carbide and/or niobium carbide. The processing of such scrap material can involve either acid or caustic digestion of said scrap material to remove cobalt and/or tungsten. The sludges generated from said either acid of digestion of said scrap material can contain tantalum, niobium, tungsten, iron, titanium, and other impurities. These sludges are representative of the type of impure source of this disclosure.

High purity tantalum and/or niobium compounds can be produced by ion exchange or solvent extraction processes. Said ion exchange or solvent extraction processes require large outlays of equipment and raw materials. Such methods are described in the following U.S. Pat. Nos.: 3,107,976, 2,895,793, 2,880,060, 2,819,945, 4,182,744, 4,069,268, 4,065,405, 3,972,710.

A process for producing high purity tantalum and/or niobium compounds from impure material without large outlays of equipment and raw materials is economically desirable.

SUMMARY OF THE INVENTION

It is an object of this invention to provide a process for recovery of tantalum from an impure source of tantalum optionally niobium containing tungsten, titanium, iron, and other impurities.

According to the present invention, an impure source is mixed with an alkali metal carbonate and dried. The dried mixture is then heated at a sufficient temperature and for a sufficient time to convert the tungsten to a water soluble form. After heating, the mixture is water leached to solubilize the tungsten. The resulting solids containing tantalum values and other impurities are separated from the resulting solution. The resulting solids containing the tantalum and impurities are then digested in hydrochloric acid of sufficient strength and at a sufficient temperature and for a sufficient time to solubilize the iron and some of the titanium. The solid phase of the digestion mixture which contains the tantalum and some of the titanium is separated from the liquid phase. The solid phase is then contacted with hydrofluoric acid of sufficient strength to solubilize the tantalum and titanium values. Any insolubles are then removed. The hydrofluoric acid solution containing the tantalum and titanium is then adjusted to a pH of from about 6.0 to about 8.0 with a base to form a first precipitate minor portion of the titanium, leaving the major portion of the titanium in the resulting solution. The first tantalum precipitate is then separated from the solution and dissolved in an aqueous solution of oxalic acid of sufficient strength to solubilize the tantalum values. The resulting oxalic acid solution containing the tantalum values and a minor portion of the titanium is separated from the resulting insolubles. The resulting oxalic acid solution is then adjusted to a pH of about 6.5 to about 7.0 with a base to form a second precipitate of tantalum hydroxide and tantalum dioxyfluoride. The second precipitate of tantalum hydroxide and tantalum dioxyfluoride is separated from the resulting mother liquor, and dissolved in hydrochloric acid. The resulting hydrochloric acid solution containing the tantalum values is digested at a sufficient temperature and for a sufficient time to precipitate the tantalum in a highly purified form.

DETAILED DESCRIPTION OF THE INVENTION

The impure source can be but is not limited to the sludges generated from the processing of tungsten carbide scrap material which can contain tantalum and or niobium carbide such as by acid or caustic digestion, or any like materials. The sludges or like material can contain in addition to the tantalum and/or niobium, tungsten, titanium, iron, or other impurities.

In order to form pure tantalum from the impure sources, the following process is carried out. The impure source is mixed with an alkali metal carbonate, preferably sodium carbonate and the mixture is dried to remove any water. The dried mixture is then heated at a sufficient temperature and time to convert the tungsten to a soluble form. Heating temperatures are generally from about 700° C. to about 850° C. with from about 750° C. to about 800° C. being preferred. Heating times are generally for from about 2 hours to about 8 hours with from about 3 hours to about 5 hours being preferred. After the heating step, the mixture is leached with water under any conditions which will result in the solubilization of the tungsten. The resulting solids contain tantalum values and other impurities and are separated from the liquid phase which contains the tungsten by any standard technique, preferably filtration. The resulting solids are then further processed as described below for the removal of the iron and a portion of the titanium.

The resulting solids containing the tantalum values and impurities such as iron and titanium are then digested in hydrochloric acid of sufficient strength, at a sufficient temperature, and for a sufficient time to solubilize the iron and some of the titanium. Hydrochloric acid strengths of from about 3N to about 13N are generally used with from about 5N to about 10N being preferred. Digestion temperatures are generally from about 50° C. to about 100° C. with from about 80° C. to about 90° C. being preferred. Digestion times are generally for from about 2 hours to about 4 hours. The solid phase of the hydrochloric acid digestion mixture which contains the tantalum values and a portion of the titanium is separated from the liquid phase which contains the iron and a portion of the titanium by any standard technique such as filtration.

The solid phase of the hydrochloric acid digestion mixture containing the tantalum and a portion of the titanium is contacted with an aqueous solution of hydrofluoric acid of sufficient strength to solubilize the tantalum values. Generally from about 12N to about 40N hydrofluoric acid is used with from about 25N to about 30N being preferred. The resulting hydrofluoric acid solution contains the tantalum values and a portion of the titanium and is separated from the insolubles by any standard technique such as filtration. The hydrofluoric acid solution is adjusted to a pH of from about 6.0 to about 8.5 with from about 7.5 to about 8.0 being preferred with a base to form a first precipitate of tantalum hydroxide, ammonium fluorotantalate and a minor portion of the titanium, leaving the greater portion of the titanium in the resulting mother liquor. The base can be ammonia or ammonium hydroxide which is ammonia and water. The first precipitate of tantalum hydroxide is separated from the resulting mother liquor by an standard technique such as filtration.

The first precipitate of tantalum hydroxide and ammonium fluorotantalate is dissolved in an aqueous solution of oxalic acid of sufficient strength to solubilize the tantalum values. The oxalic acid solution is generally made up of from about 0.05 parts to about 0.15 parts of oxalic acid to 1 part of water with from about 0.08 parts to about 0.10 parts of oxalic acid to 1 part of water being preferred. The resulting oxalic acid solution containing the tantalum and some titanium is separated from any insolubles by an standard technique such as filtration. The resulting oxalic acid solution is adjusted to a pH of from about 6.0 to about 7.5 with from about 6.5 to about 7.0 being preferred with a base to form a second precipitate of tantalum hydroxide and tantalum dioxyfluoride and a small portion of the titanium, leaving the greater portion of the titanium in the resulting oxalate mother liquor. The base can be ammonia or ammonium hydroxide which is ammonia and water. The second precipitate is separated from oxalate mother liquor by any standard technique such as filtration.

The second precipitate of tantalum hydroxide and tantalum dioxyfluoride is contacted with hydrochloric acid of sufficient strength to dissolve the precipitate. Generally hydrochloric acid concentrations of from about 1N to about 10N are used with from about 3N to about 5N being preferred. The resulting hydrochloric acid solution containing the tantalum values is digested at a sufficient temperature and for a sufficient time to precipitate tantalum. Generally digestion times are from about 1 hours to about 6 hours with from about 2 hours to about 4 hours being preferred. The resulting tantalum is of high purity.

EXAMPLE

An impure tantalum source generated from the processing of tungsten carbide scrap is mixed with equal parts of sodium carbonate. The mixture is dried, heated to 750° C. for 5 hours, and leached with water to remove soluble tungsten. The resulting solids are digested in a 7N hydrochloric acid solution at 80° C. for 3 hours. The resulting solid is separated and contacted with hydrochloric acid of about 20N to solubilize the tantalum. The pH is adjusted to about 7.7 with ammonium hydroxide to form a tantalum precipitate. The precipitate appears to be a mixture of tantalum hydroxide and ammonium fluorotantalate. The separated precipitate is then dissolved in oxalic acid containing about 0.1 parts of acid per part water. After a pH adjustment to 7.0 with ammonium hydroxide, the precipitate which forms is separated. This second precipitate is contacted with 4N hydrochloric acid digested to form another precipitate of tantalum which is of high purity.

What is claimed is:

1. A process for recovery of tantalum from an impure source containing tungsten, titanium, iron, and other impurities, said process comprising:
   (a) mixing said impure source with an alkali metal carbonate to form a mixture;
   (b) drying said mixture,
   (c) heating the dried mixture at a sufficient temperature and for a sufficient time to convert said tungsten impurities to a water soluble form and form a resulting mixture,
   (d) leaching the resulting mixture with water to form a two phase system in which the liquid phase contains tungsten values and the solid phase contains the tantalum values and other impurities,
   (e) separating said liquid phase containing the tungsten values from said solid phase containing the tantalum values and other impurities,
   (f) digesting said solid phase containing the tantalum values and other impurities in a hydrochloric acid solution of sufficient strength, at a sufficient temperature and for a sufficient time to solubilize iron and a portion of the titanium impurities and form a liquid phase comprising iron and titanium,
   (g) separating the liquid phase comprising iron and titanium from the resulting solid phase containing the tantalum values and depleted titanium values,
   (h) contacting said resulting solid phase with an aqueous solution of hydrofluoric acid of sufficient strength to solubilize said tantalum values and titanium values,
   (i) separating the resulting hydrofluoric acid solution containing said tantalum values and titanium values from any insolubles,
   (j) adjusting the pH of said hydrofluoric acid solution containing said tantalum values and said titanium values from about 6.0 to about 8.0 with a base to form a first tantalum precipitate whereby a major portion of said titanium values remain in the resulting solution,
   (k) separating the first tantalum precipitate from said resulting first solution,
   (l) dissolving said first tantalum precipitate in an aqueous solution of oxalic acid of sufficient strength to solubilize the tantalum values,
   (m) separating the resulting oxalic acid solution containing the tantalum values and said minor portion of titanium from the resulting insolubles,
   (n) adjusting the pH of said oxalic acid solution to from about 6.5 to about 7.0 with a base to form a second tantalum precipitate and a second solution,
   (o) separating said second tantalum precipitate from the second solution,
   (p) dissolving said second tantalum precipitate in hydrochloric acid, and
   (q) digesting the resulting hydrochloric acid solution containing tantalum values at a sufficient temperature and for a sufficient time to form a two phase system including a solid phase consisting of a third tantalum precipitate of high purity.

2. A process according to claim 1 wherein said alkali metal carbonate is sodium carbonate.

3. A process according to claim 1 wherein said dried mixture is heated at a temperature of from about 750° C. to about 800° C. for about 3 to about 5 hours.

4. A process according to claim 1 wherein the solid phase containing the tantalum values and other impurities is digested in hydrochloric acid of from about 5N to about 10N.

5. A process according to claim 4 wherein the digestion temperature is from about 60° C. to about 100° C.

6. A process according to claim 5 wherein the digestion time is from about 3 hours to about 5 hours.

7. A process according to claim 1 wherein said solid phase containing the tantalum values and other impurites is contacted with an aqueous solution of hydrofluoric acid solution of from about 25N to about 30N.

8. A process according to claim 7 wherein the pH of the aqueous solution of hydrofluoric acid containing tantalum is adjusted to from about 6.0 to about 8.0.

9. A process according to claim 8 wherein the pH is adjusted with ammonia.

10. A process according to claim 1 wherein said aqueous solution of oxalic acid contains from about 0.05 to about 0.15 parts of oxalic acid to 1 part of water.

11. A process according to claim 1 wherein said second precipitate is dissolved in about 3N to about 5N hydrochloric acid.

12. A process according to claim 1 wherein the resulting hydrochloric acid solution containing tantalum is digested at from about 70° C. to about 90° C.

13. A process according to claim 12 wherein the digestion time is from about 2 hours to about 4 hours.

* * * * *